(12) United States Patent
Salter et al.

(10) Patent No.: US 10,059,161 B1
(45) Date of Patent: Aug. 28, 2018

(54) CAPACITIVE MONITORING OF VEHICLE HITCHES

(71) Applicant: Ford Global Technologies, LLC, Dearborn, MI (US)

(72) Inventors: Stuart C. Salter, White Lake, MI (US); Pietro Buttolo, Dearborn Heights, MI (US); Erick Michael Lavoie, Dearborn, MI (US); Paul Kenneth Dellock, Northville, MI (US); Aaron Bradley Johnson, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/682,465

(22) Filed: Aug. 21, 2017

(51) Int. Cl.
| | |
|---|---|
| *B60D 1/64* | (2006.01) |
| *B60D 1/06* | (2006.01) |
| *B60D 1/36* | (2006.01) |
| *B60D 1/26* | (2006.01) |
| *B60D 1/28* | (2006.01) |
| *B60Q 1/00* | (2006.01) |

(52) U.S. Cl.
CPC ............ *B60D 1/64* (2013.01); *B60D 1/065* (2013.01); *B60D 1/26* (2013.01); *B60D 1/28* (2013.01); *B60D 1/36* (2013.01); *B60Q 1/0076* (2013.01)

(58) Field of Classification Search
CPC ......... G08B 21/00; G08B 29/00; G08B 1/00; B60R 25/00
See application file for complete search history.

(56) References Cited

U.S. PATENT DOCUMENTS

| | | | |
|---|---|---|---|
| 3,710,370 A * | 1/1973 | Quilici ................... | B60D 1/065 180/271 |
| 4,737,763 A | 4/1988 | DeFino et al. | |
| 5,159,312 A * | 10/1992 | Engle ..................... | B60D 1/36 307/9.1 |
| 6,980,096 B1 * | 12/2005 | Washington ............ | B60D 1/58 340/431 |
| 7,535,346 B2 | 5/2009 | Kalous | |
| 8,376,387 B2 | 2/2013 | Columbia | |
| 9,266,401 B2 | 2/2016 | Klank et al. | |
| 9,393,846 B2 | 7/2016 | Kadnikov et al. | |
| 2005/0258977 A1 * | 11/2005 | Kiefer ..................... | G08G 1/16 340/903 |
| 2011/0190972 A1 * | 8/2011 | Timmons ............... | G01C 21/34 701/31.4 |
| 2011/0253463 A1 * | 10/2011 | Smith ..................... | B60D 1/00 180/11 |

FOREIGN PATENT DOCUMENTS

| | | |
|---|---|---|
| EP | 2366563 A2 | 9/2011 |
| EP | 2623344 A1 | 8/2013 |

* cited by examiner

*Primary Examiner* — John Daniel Walters
*Assistant Examiner* — James J Triggs
(74) *Attorney, Agent, or Firm* — James P. Muraff; Neal, Gerber & Eisenberg LLP (57) ABSTRACT

Method and apparatus are disclosed for capacitive monitoring of vehicle hitches. An example vehicle includes a hitch that includes a body, a hitch ball, and a sleeve that electrically insulates the hitch ball from the body. The example vehicle also includes a hitch module including a capacitive switch electrically coupled to the hitch ball. The hitch module is to wirelessly emit an alert that a trailer has decoupled from the hitch responsive to the capacitive switch detecting, via the hitch ball, a predetermined increase in capacitance.

20 Claims, 6 Drawing Sheets

CAPACITIVE MONITORING OF VEHICLE HITCHES

TECHNICAL FIELD

The present disclosure generally relates to vehicle hitches and, more specifically, to capacitive monitoring of vehicle hitches.

BACKGROUND

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, a trailer is connected to a hitch that is located toward a rear side of the vehicle to enable the vehicle to tow the trailer and object(s) stored within the trailer.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for capacitive monitoring of vehicle hitches. An example disclosed vehicle includes a hitch that includes a body, a hitch ball, and a sleeve that electrically insulates the hitch ball from the body. The example disclosed vehicle also includes a hitch module including a capacitive switch electrically coupled to the hitch ball. The hitch module is to wirelessly emit an alert that a trailer has decoupled from the hitch responsive to the capacitive switch detecting, via the hitch ball, a predetermined increase in capacitance An example disclosed method includes monitoring, via a capacitive switch of a hitch module, a capacitance around a hitch ball of a hitch. The hitch ball is electrically insulated via a sleeve. The example disclosed method also includes detecting whether there is a predetermined increase in capacitance around the hitch ball and wirelessly emitting, via the hitch module, an alert that a trailer has decoupled from the hitch responsive to the capacitive switch detecting, via the hitch ball, a predetermined increase in capacitance.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, a trailer is connected to a hitch that is located toward a rear side of the vehicle to enable the vehicle to tow the trailer and object(s) stored within the trailer. Some vehicles and trailers include sensors for detecting when a trailer is coupled or decoupled from a vehicle.

Further, vehicles typically include a liftgate that enables user(s) to access a trunk and/or other cargo area of the vehicle. As used herein, a "liftgate" refers to a door or panel at a rear of a vehicle that opens upwardly to provide access to a trunk and/or another cargo area or compartment of the vehicle. In some examples, the liftgate includes a hatch that is coupled to a body of the vehicle (e.g., a sports-utility vehicle (SUV), a minivan, a hatchback. etc.) via a hinge located along an upper edge of a cargo area or compartment. In other examples, the liftgate includes a trunk lid that is coupled to a body of the vehicle (e.g., a sedan, a compact car, etc.) via a hinge along an outer edge of a trunk.

Recently, some vehicles include hands-free liftgate systems that enable a user to initiate opening and/or closing of a liftgate without use of his or her hands. As used herein, a "hands-free liftgate system" refers to a vehicle system that enables a user to initiate opening and/or closing of a liftgate without use of his or her hands. Some example hands-free liftgate systems include proximity sensor(s) located near the liftgate of the vehicle and cause the liftgate to actuate upon the proximity sensor(s) detecting that a vehicle operator is located near the liftgate.

In some instances, the detection area of the sensors that monitor the connection between the trailer and the vehicle overlap with the detection area of the proximity sensors of the hands-free liftgate system of the vehicle. As a result, the sensors for the trailer connection may potentially detect that the trailer is being coupled to or decoupled from the vehicle when a user is attempting to open or close the liftgate via the hands-free liftgate system, or the proximity sensors of the hands-free liftgate system may potentially open or close the liftgate when a user is attempting to couple or decouple the trailer and the vehicle.

Examples methods and apparatus disclosed herein include a system for detecting when a trailer is connected to a hitch of a vehicle that is spaced apart from a hands-free liftgate system of the vehicle to prevent the hitch monitoring system from overlapping with the hands-free liftgate system. The hitch includes a hitch body and a hitch ball coupled to the hitch body. A capacitive switch is electrically coupled to the hitch ball, which is electrically isolated from the hitch body via an insulation layer positioned between the hitch ball and the hitch body. In some examples, the hitch ball and the hitch body are positioned so that an electric field of the hitch ball utilized by the capacitive switch for detection of object(s) is emitted upward to prevent the hitch monitoring system from interfering with a hands-free liftgate system of the vehicle. A hitch module includes the capacitive switch and a short-range communication module (e.g., a BLE module) that is configured to wireless communicate with a communication module of the vehicle (e.g., a first communication module) and a mobile device of a vehicle operator. When the capacitive switch detects a first predetermined change in capacitance, the hitch module sends a signal via short-range wireless communication to the vehicle and/or the mobile device of the vehicle operator to warn the vehicle operator that the trailer has been decoupled from the hitch. In some examples, another communication module of the vehicle (e.g., a second communication module) sends a signal via cellular communication to the mobile device of the vehicle operator upon detecting that the vehicle operator is beyond a communication range of the short-range communication module of the hitch module.

Figure 1:
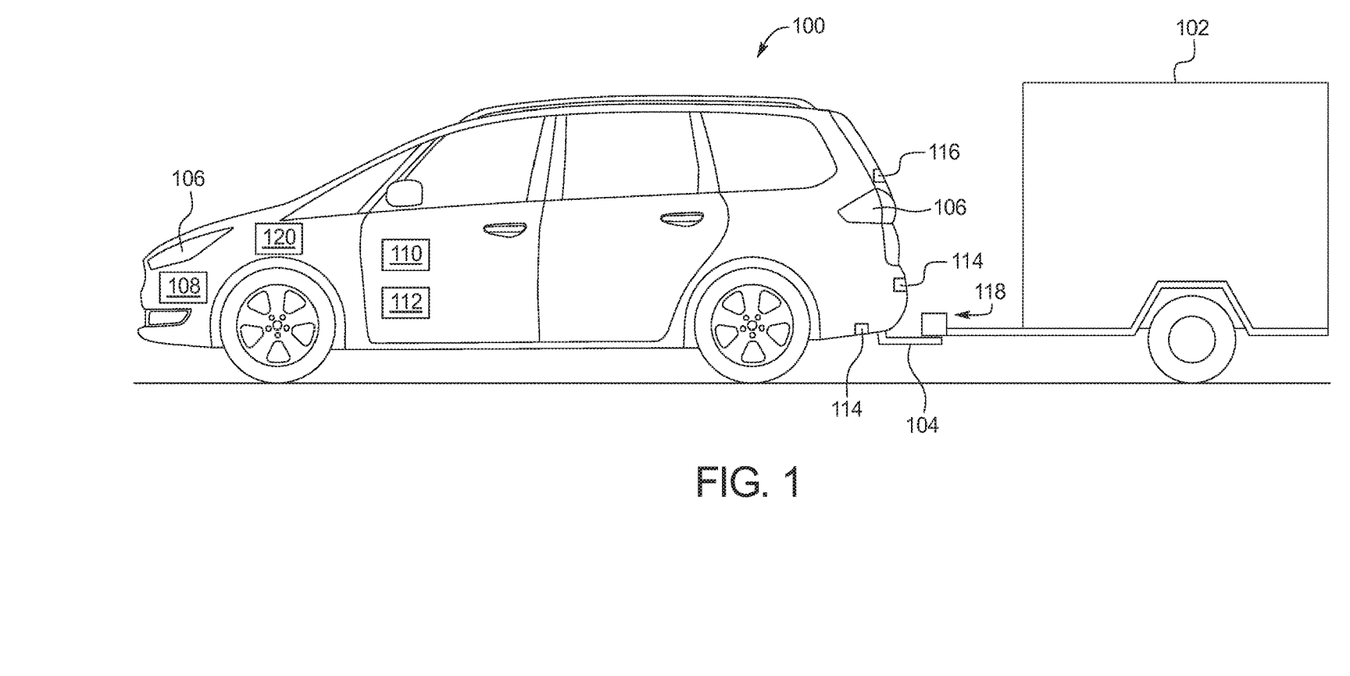
FIG. 1 illustrates a trailer coupled to a vehicle via an example hitch in accordance with the teachings herein.

Turning to the figures, FIG. 1 illustrates an example vehicle 100 in accordance with the teachings here. In the illustrated example, a trailer 102 is coupled to the vehicle 100 via a hitch 104 of the vehicle 100. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes the hitch 104, exterior lights 106, a horn 108, a communication module 110, and another communication module 112.

The hitch 104 (e.g., a tow hitch, a tow bar, a trailer hitch, etc.) of the illustrated example is located towards the rear of the vehicle 100. For example, the hitch 104 is coupled to and/or extends from a chassis of the vehicle 100. The hitch 104 is configured to receive a trailer connector of the trailer 102 (e.g., a trailer coupler 306 of FIG. 3) to couple the trailer 102 to the vehicle 100. That is, the vehicle 100 is able to tow the trailer 102 when the trailer 102 is coupled to the vehicle 100 via the hitch 104.

The exterior lights 106 of the vehicle 100 include one or more lights (e.g., headlights, taillights, etc.) of the vehicle 100 that emit light from an exterior of the vehicle 100. Further, the horn 108 is a sound-making device that emits audio signal(s) directed to a surrounding area of the vehicle 100. Oftentimes, an operator (e.g., a driver) of the vehicle 100 utilizes the horn 108 to provide an alert that the vehicle 100 is approaching and/or to call attention to a hazard. Additionally or alternatively, the vehicle 100 includes other sound-making device(s) that emit audio signal(s) directed to the surrounding area of the vehicle 100.

The communication module 110 of the illustrated example includes wired or wireless network interfaces to enable communication with external networks. The communication module 110 also includes hardware (e.g., processors, memory, storage, antenna, etc.) and software to control the wired or wireless network interfaces. In the illustrated example, the communication module 110 includes one or more communication controllers for cellular networks (e.g., Global System for Mobile Communications (GSM), Universal Mobile Telecommunications System (UMTS), Long Term Evolution (LTE), Code Division Multiple Access (CDMA)) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). In some examples, the communication module 110 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The communication module 112 of the illustrated example includes wired or wireless network interfaces to enable communication with external networks. The communication module 110 also includes hardware (e.g., processors, memory, storage, antenna, etc.) and software to control the wired or wireless network interfaces. In the illustrated example, the communication module 112 includes one or more communication controllers for wireless personal area network(s) (e.g., including area networks based on the IEEE 802.15 standard) and/or wireless local area network(s) (e.g., Wi-Fi networks and/or other area networks based on the IEEE 802.11 standard). For example, the communication module 112 is a short-range wireless module that includes the hardware and firmware to establish a connection with a mobile device and/or another short-range wireless module (e.g., a short-range communication module 820 of FIG. 8) that is located nearby. In some examples, the short-range wireless module implements the Bluetooth® and/or Bluetooth Low Energy (BLE) protocols. The Bluetooth® and BLE protocols are set forth in Volume 6 of the Bluetooth® Specification 4.0 (and subsequent revisions) maintained by the Bluetooth® Special Interest Group.

The vehicle 100 of the illustrated example also includes one or more proximity sensors 114 of the a hands-free liftgate system. For example, the hands-free liftgate system enables an operator of the vehicle 100 to open a liftgate (e.g., a liftgate 204 of FIG. 2) without utilizing his or her hands. The proximity sensors 114 are to detect when the operator of the vehicle 100 is nearby, for example, by measuring a change in capacitance that is caused by the presence of the operator near the proximity sensors 114. In the illustrated example, the proximity sensors 114 are positioned toward a rear of the vehicle 100 to monitor an activation area (e.g., an activation area 202 of FIG. 2) of the liftgate. For example, when one or more of the proximity sensors 114 detects that the operator of the vehicle 100 has extended his or her leg into the activation area, the hands-free liftgate system opens and/or closes the liftgate of the vehicle 100.

As illustrated in FIG. 1, the vehicle 100 also includes a camera 116 that is positioned toward the rear of the vehicle 100 near the proximity sensors 114 and the hitch 104. In some examples, the camera 116 capture image(s) and/or video of the activation area of the hands-free liftgate system to verify that an operator of the vehicle 100 has extended his or her leg into the activation area. Additionally or alternatively, the camera 116 captures image(s) and/or video of the hitch 104 for monitoring the hitch 104 and/or the connection between the vehicle 100 and the trailer 102.

Further, the vehicle 100 of the illustrated example includes a monitoring system 118 and an alert controller 120. For example, the monitoring system 118 monitors and/or emits alerts a status of the hitch 104. For example, the monitoring system 118 is to determine whether the trailer 102 is coupled to the hitch 104, whether a person is near (e.g., touching) the hitch 104, etc. Further, the monitoring system 118 subsequently is to provide an alert that the trailer 102 has been coupled to the hitch 104, the trailer 102 has been decoupled from the hitch 104, a person is near the hitch 104, etc. The alert controller 120 of the illustrated example monitors, via the communication module 112 (e.g., a first communication module), whether a key fob or phone-as-a-key of an operator of the vehicle 100 is nearby and/or a mobile device of the operator is able to receive an alert emitted by the monitoring system 118 via a wireless personal area network. As used herein, a "key fob" refers to an electronic device that wirelessly communicates with a vehicle to unlock door(s), open door(s) and/or activate an engine of a vehicle. As used herein, a "phone-as-a-key" refers to a mobile device (e.g., a smart phone, a wearable, a smart watch, a tablet, etc.) that includes hardware and/or software to function as a key fob.

Further, the alert controller 120 relays, via the communication module 110 (e.g., a second communication module), an alert to the mobile device of the operator via a cellular network if the mobile device of the operator is unable to directly receive the alert from the monitoring system 118 via the wireless personal area network. Additionally or alternatively, the alert controller 120 emits an alarm (e.g., via the exterior lights 106, the horn 108, etc.) if the key fob or phone-as-a-key of the operator is not near the vehicle 100.

Figure 2:
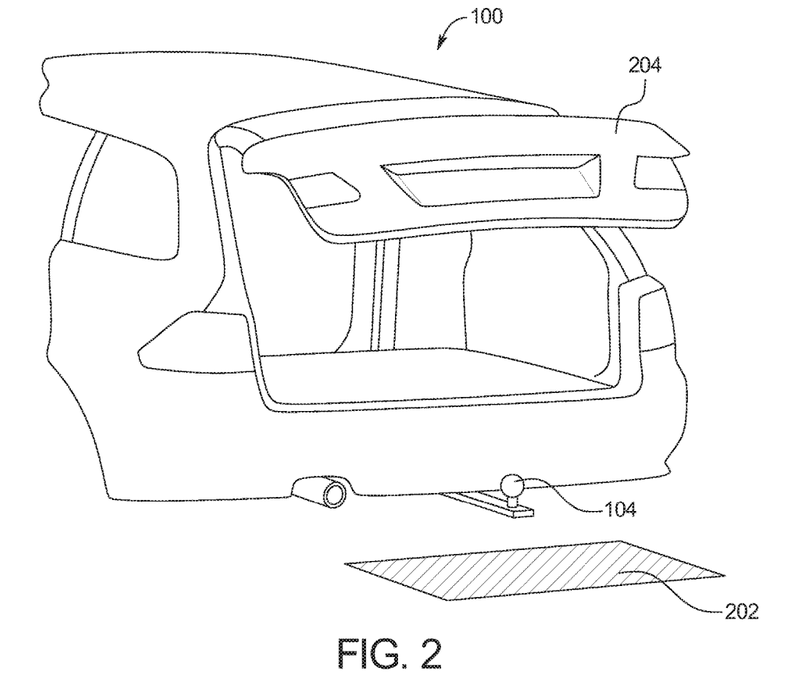
FIG. 2 illustrates the hitch and a hands-free liftgate system of the vehicle of FIG. 1.

FIG. 2 illustrates the hitch 104 and a hands-free liftgate system of the vehicle 100. As illustrated in FIG. 2, an activation area 202 of the hands-free liftgate system is below a liftgate 204 that is near the hitch 104 of the vehicle 100. The activation area 202 is defined, at least in part, by the proximity sensors 114. In the illustrated example, the proximity sensors 114 of the vehicle 100 are oriented downward toward a ground surface such that the activation area 202 is located below the hitch 104 toward and/or along the ground surface. The activation area 202 is utilized by a user of the vehicle 100 to cause the liftgate 204 to actuate. For example, the user extends his or her leg (e.g., a foot) into the activation area 202 to cause the hands-free liftgate system to open and/or close the liftgate 204.

Figure 3:
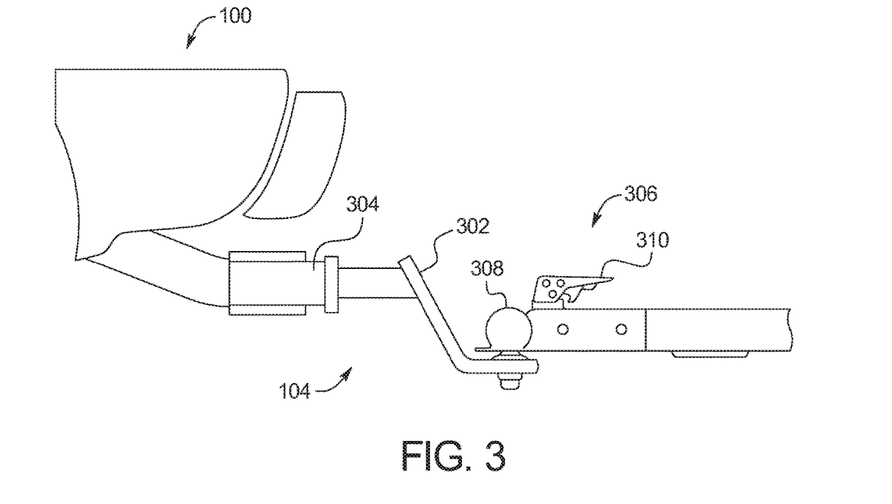
FIG. 3 illustrates a connector of the trailer of FIG. 1 coupled to the hitch of the vehicle of FIG. 1.

FIG. 3 further illustrates the hitch 104 of the vehicle 100 when the trailer 102 is coupled to the vehicle 100 via the hitch 104. As illustrated in FIG. 3, the hitch 104 includes a hitch body 302 and a receiver tube 304. The receiver tube 304 is coupled to a portion of a body (e.g., a chassis) of the vehicle 100. The hitch body 302 is inserted into and received by the receiver tube 304 to couple the hitch body 302 to the body of the vehicle 100.

As illustrated in FIG. 3, a trailer coupler 306 of the trailer 102 couples to the hitch 104 of the vehicle 100 to couple the trailer 102 to the vehicle 100. In the illustrated example, the trailer coupler 306 includes a receiver 308 that is to receive a hitch ball (e.g., a hitch ball 406 of FIG. 4) of the hitch 104 and a latch 310 that is to secure a connection between the receiver 308 and the hitch ball to couple the trailer coupler 306 to the hitch 104.

Figure 4:
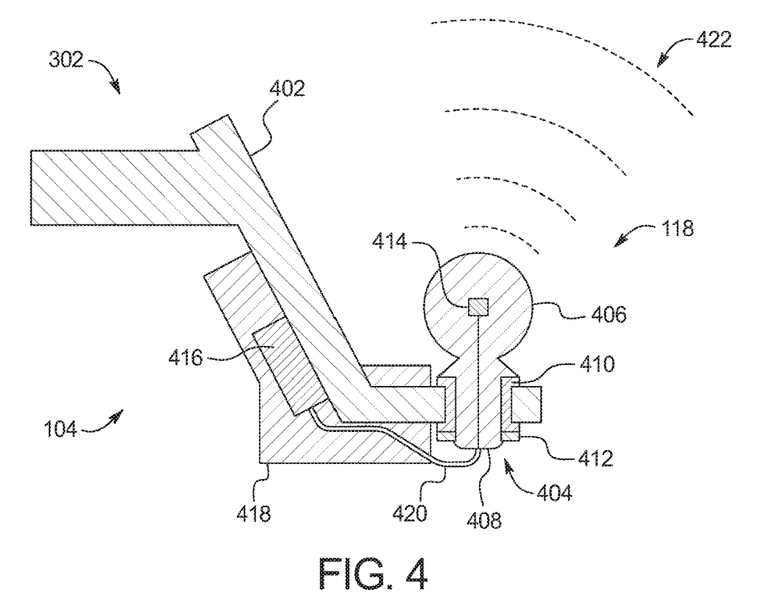
FIG. 4 illustrates a capacitive detection system of the hitch of FIG. 1.

FIG. 4 illustrates the monitoring system 118 of the hitch 104. As illustrated in FIG. 4, the hitch body 302 includes a post 402 that protrudes away from the vehicle 100 when the hitch body 302 is coupled to the vehicle 100. For example, the hitch body 302 is formed of, for example, a strong metallic material that enables the hitch body 302 to retain its shape while the trailer 102 is being towed by the vehicle 100 via the hitch 104. Further, the hitch body 302 defines an aperture 404 at the distal end of the hitch body 302.

The hitch 104 of the illustrated example also includes a hitch ball 406 that is received by the receiver 308 of the trailer coupler 306 to couple the trailer 102 to the vehicle 100. In the illustrated example, a protrusion 408 is integrally formed with and extends from the hitch ball 406. The hitch ball 406 (as well as the protrusion 408) is formed, for example, of a metallic material. For example, the metallic material of the hitch ball 406 is electrically conductive that facilitates capacitive measurements and has a strength that enables the hitch ball 406 to tow the trailer 102.

To couple the hitch ball 406 to the hitch body 302, the protrusion 408 is inserted into and at least partially extends into the aperture 404 defined by the hitch body 302. As illustrated in FIG. 4, a sleeve 410 is positioned within the aperture 404 between the protrusion 408 of the hitch ball 406 and the hitch body 302 to electrically insulate the hitch ball 406 from the hitch body 302. For example, the sleeve 410 is securely positioned within the aperture 404 via a washer. Further, a nut 412 couples to the end of the protrusion 408 to securely couple the hitch ball 406 to the hitch body 302 of the hitch 104.

As illustrated in FIG. 4, the monitoring system 118 includes an electrical connector 414 that is positioned within and electrically coupled to the hitch ball 406. Further, a hitch module 416 is coupled to the post 402 of the hitch body 302 and is covered by a protective covering 418 (e.g., an overmold) to protect the hitch module 416 from being removed from the hitch 104 and/or damaged by foreign object(s). As illustrated in FIG. 4, the electrical connector 414 receives wiring 420 that is electrically coupled to the hitch module 416 to electrically couple the hitch ball 406 to a capacitive switch (e.g., a capacitive switch 822 of FIG. 8) of the hitch module 416.

In the illustrated example, the hitch module 416 provides a small charge to the hitch ball 406, which is formed of conductive material, to enable the hitch ball 406 to emit an electric field 422 and form a capacitive sensor. When a grounded object (e.g., the receiver 308 of the trailer coupler 306, a person) is positioned within the electric field 422, the capacitive switch that is electrically coupled to the hitch ball 406 measures an increase in capacitance detected via the hitch ball 406. Likewise, when a grounded object (e.g., the receiver 308 of the trailer coupler 306, a person) is removed from the electric field, the capacitive switch measures a decrease in capacitance detected via the hitch ball 406. Some changes in capacitance correspond to objects being coupled to or removed from the hitch ball 406. For example, when the trailer coupler 306 of the trailer 102 is being coupled to the hitch ball 406, the capacitive switch measures a first predetermined decrease in capacitance detected via the hitch ball 406. When the trailer coupler 306 of the trailer 102 is being decoupled and/or removed from the hitch ball 406, the capacitive switch measures a predetermined increase in capacitance detected via the hitch ball 406. Further, when a portion of a person (e.g., a foot, a finger, etc.) is positioned near the hitch ball 406 within the electric field 422, the capacitive switch measures a second predetermined decrease in capacitance detected via the hitch ball 406.

As illustrated in FIG. 4, the hitch ball 406 is positioned above the hitch body 302 of the hitch 104 such that electric field 422 is emitted upward from the hitch ball 406 but not downward from the hitch ball 406. For example, the hitch body 302, which is formed of conductive material, is grounded to prevent electric field 422 from being emitted from the hitch ball 406 beyond the hitch body 302. That is, the hitch body 302 is positioned between the hitch ball 406 and the ground surface to enable the hitch ball 406 and the capacitive switch to monitor a change in capacitance of an area around the hitch ball 406 above the hitch body 302 and to prevent the hitch ball 406 and the capacitive switch from monitoring a change in capacitance of an area below the hitch body 302 of the hitch 104. For example, the hitch ball 406 is positioned above the hitch body 302 and the proximity sensors 114 of the hands-free liftgate system to enable the hitch ball 406 and the capacitive switch of the monitoring system 118 to monitor a first area above the hitch body 302 and the proximity sensors 114 of the hands-free liftgate system to monitor a second area (e.g., the activation area 202) below the hitch body 302. In other words, the hitch ball 406 is positioned relative to the hitch body 302 and the proximity sensors 114 to separate the area monitored by the monitoring system 118 of the hitch 104 and the area monitored by the hands-free liftgate system of the liftgate 204.

Figure 5:
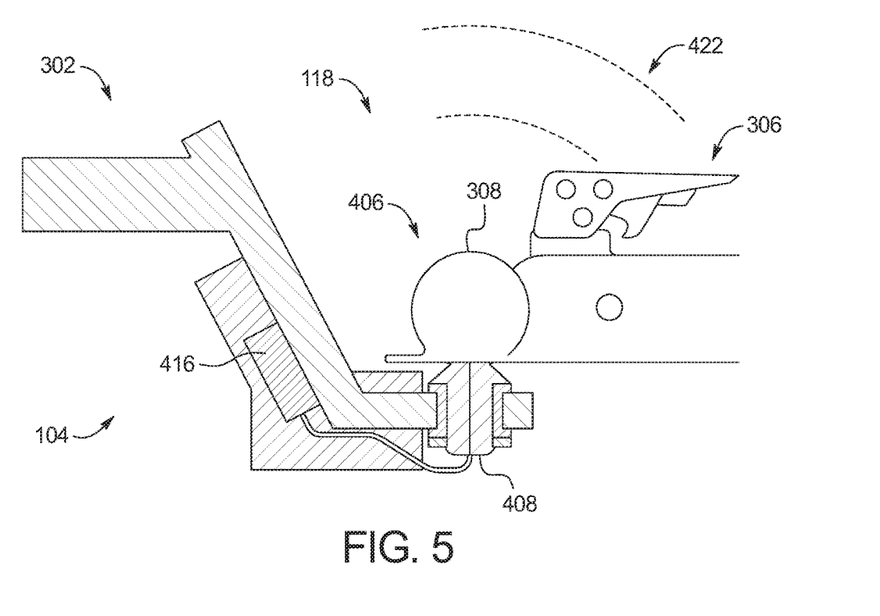
FIG. 5 illustrates the capacitive detection system of FIG. 4 detecting the connector of FIG. 3.

FIG. 5 illustrates the monitoring system 118 of the hitch 104 when the trailer coupler 306 of the trailer 102 is coupled to the hitch ball 406 of the hitch 104. As illustrated in FIG. 5, when the trailer coupler 306 is coupled to the hitch ball 406, the receiver 308 and/or other portions of the trailer coupler 306 are positioned within the electric field 422 that is emitted from the hitch ball 406. Further, when the trailer coupler 306 is positioned in the electric field 422, the capacitive switch of the hitch module 416 that is electrically coupled to the hitch ball 406 detects a first predetermined decrease in capacitance via the hitch ball 406. For example, the first predetermined decrease in capacitance corresponds to the material of the trailer coupler 306 and/or a proximity of the trailer coupler 306 to the hitch ball 406 when coupled to the hitch ball 406. In turn, the hitch module 416 determines that the trailer 102 has been coupled to the hitch 104 in response to the hitch ball 406 and the capacitive switch detecting the first predetermined decrease in capacitance.

Additionally, when the trailer coupler 306 is decoupled from the hitch ball 406 of the hitch 104, the receiver 308 and/or other portions of the trailer coupler 306 are no longer positioned within the electric field 422 of the hitch ball 406. As the trailer coupler 306 is removed from the electric field 422, the capacitive switch and the hitch ball 406 of the hitch module 416 detects a corresponding predetermined increase in capacitance (e.g., that corresponds to the material of the trailer coupler 306 and/or a proximity of the trailer coupler 306 to the hitch ball 406 when coupled to the hitch ball 406). In turn, the hitch module 416 determines that the trailer 102 has been decoupled from the hitch 104 in response to the capacitive switch and the hitch ball 406 detecting the first predetermined decrease in capacitance.

Upon the capacitive switch and the hitch ball 406 detecting the first predetermined decrease in capacitance, the hitch module 416 wirelessly emits an alert (e.g., via a short-range communication module 820 of FIG. 8) to alert an operator of the vehicle 100 that the trailer 102 has been removed from the hitch 104. For example, the hitch module 416 wirelessly emits the alert via a wireless personal area network to the communication module 112 (e.g., a first communication module) of the vehicle 100 and/or to a mobile device of the operator of the vehicle 100. Upon receipt from the hitch module 416, an output device the vehicle 100 (e.g., a display 814 of FIG. 8, speakers 816 of FIG. 8) emit the alert and/or the mobile device of the operator emits (e.g., audibly, visually, haptically) emits the alert.

In some instances, the operator may not obtain the alert that is emitted from the output device(s) of the vehicle 100 if the operator is not located within the vehicle 100 at the time the alert is presented via the output device(s). Further, in some instances, the operator may not obtain the alert via the mobile device if the mobile device is outside of the range of the wireless personal area network through which the hitch module 416 emits the alert. To enable the operator to obtain the alert when he or she is located away from the vehicle 100, the alert controller 120 of the vehicle 100 identifies whether the operator is located away from the vehicle 100 by determining whether a key fob or a phone-as-a-key of the operator is located within a predetermined distance of the communication module 112. For example, the predetermined distance from the communication module 112 corresponds to the range of the wireless personal area network through which the hitch module 416 emits the alert. In response to the alert controller 120 determining that key fob or the phone-as-a-key of the operator is outside of the predetermined distance, the communication module 110 (e.g., a second communication module) relays the alert to the mobile device of the operator via a cellular network and/or other long-range network). Additionally or alternatively, the vehicle 100 emits an alarm (e.g., via the exterior lights 106 and/or the horn 108) in response to the hitch module 416 determining that the trailer 102 has decoupled from the hitch 104 and the alert controller 120 determining that the key fob or the phone-as-a-key of the operator is located outside of the predetermined distance of the communication module 112.

Figure 6:
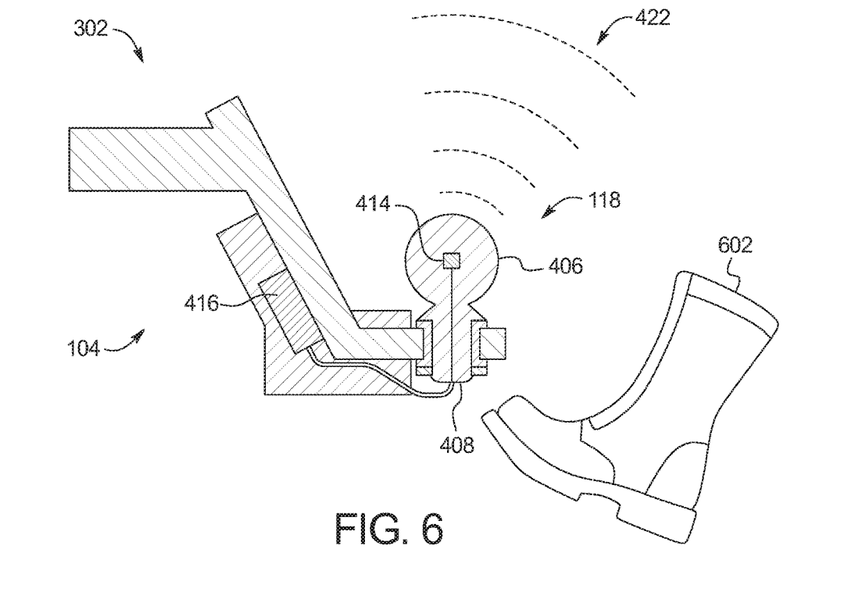
FIG. 6 illustrates a user initiating the liftgate activation system of FIG. 2 relative to the capacitive detection system of FIG. 4.
Figure 7:
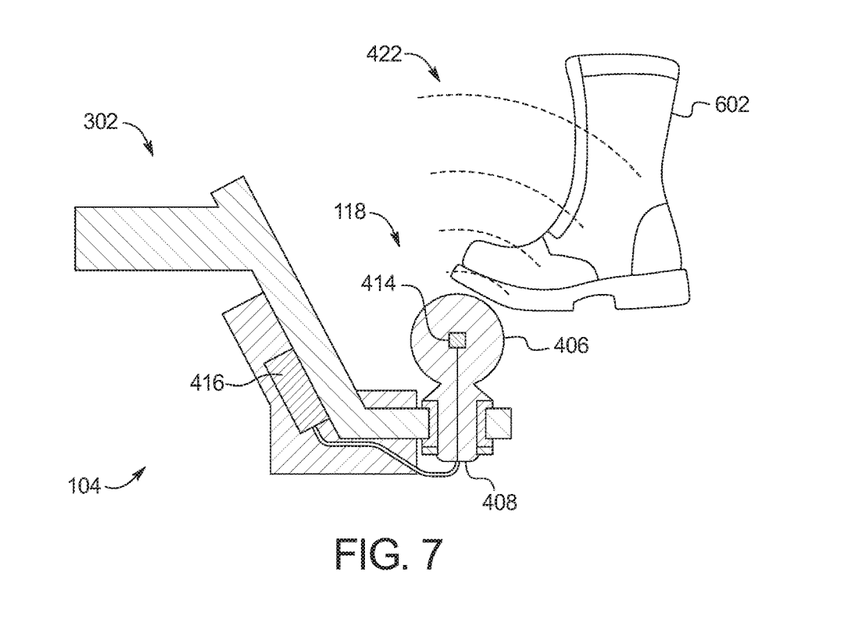
FIG. 7 illustrates the capacitive detection system of FIG. 4 detecting a user contacting the hitch of FIG. 1.

FIGS. 6-7 illustrate the monitoring system 118 of the hitch 104 when a foot 602 of a user is proximate to the hitch 104. As illustrated in FIGS. 6-7, the hitch ball 406 is positioned relative to the hitch body 302 and the proximity sensors 114 to separate the area monitored by the monitoring system 118 of the hitch 104 and the area monitored by the hands-free liftgate system of the liftgate 204.

In FIG. 6, the foot 602 of the user is positioned below the hitch body 302 and within the activation area 202 of the hands-free activation system to activate opening and/or closing of the liftgate 204. Further, the foot 602 is not positioned within the electric field 422 that is emitted by the hitch ball 406. In turn, the capacitive switch and the hitch ball 406 do not detect a change in capacitance when the foot 602 is located below the hitch body 302.

In FIG. 7, the foot 602 of the user is positioned above the hitch body 302. Thus, the foot 602 of the user is not positioned within the activation area 202 of the hands-free activation system for activating opening and/or closing of the liftgate 204. Further, as a result of the foot 602 being positioned within the electric filed 422 above the hitch body 302 and near the hitch ball 406, the capacitive switch of the hitch module 416 detects a change in capacitance via the hitch ball 406. For example, the hitch module 416 determines that the foot 602 and/or another portion of a person is near (e.g., stepping on with the foot 602, touching with a hand, etc.) the hitch ball 406 responsive to the capacitive switch detecting a second predetermined decrease in capacitance via the hitch ball 406. For example, the second predetermined decrease in capacitance that corresponds with a person being near the hitch ball 406 is different than the first predetermined decrease in capacitance that corresponds with the trailer coupler 306 coupling to the hitch 104. As a result, the hitch module is able to differential between a person and the trailer coupler 306 via the change in capacitance measured by the capacitive switch via the hitch ball 406.

In some examples, a light (e.g., an LED-based light 818 of FIG. 8) illuminates an area around the hitch 104 responsive to the hitch module 416 detecting that a person is near the hitch ball 406. For example, the light is illuminated to facilitate an operator of the vehicle 100 in viewing who is near the hitch ball 406 and/or to warn the person near the hitch ball 406 not to touch the hitch 104 and/or the trailer 102. To cause the vehicle 100 to illuminate the light, the hitch module 416 wirelessly sends a signal to the communication module 112 of the vehicle 100.

Figure 8:
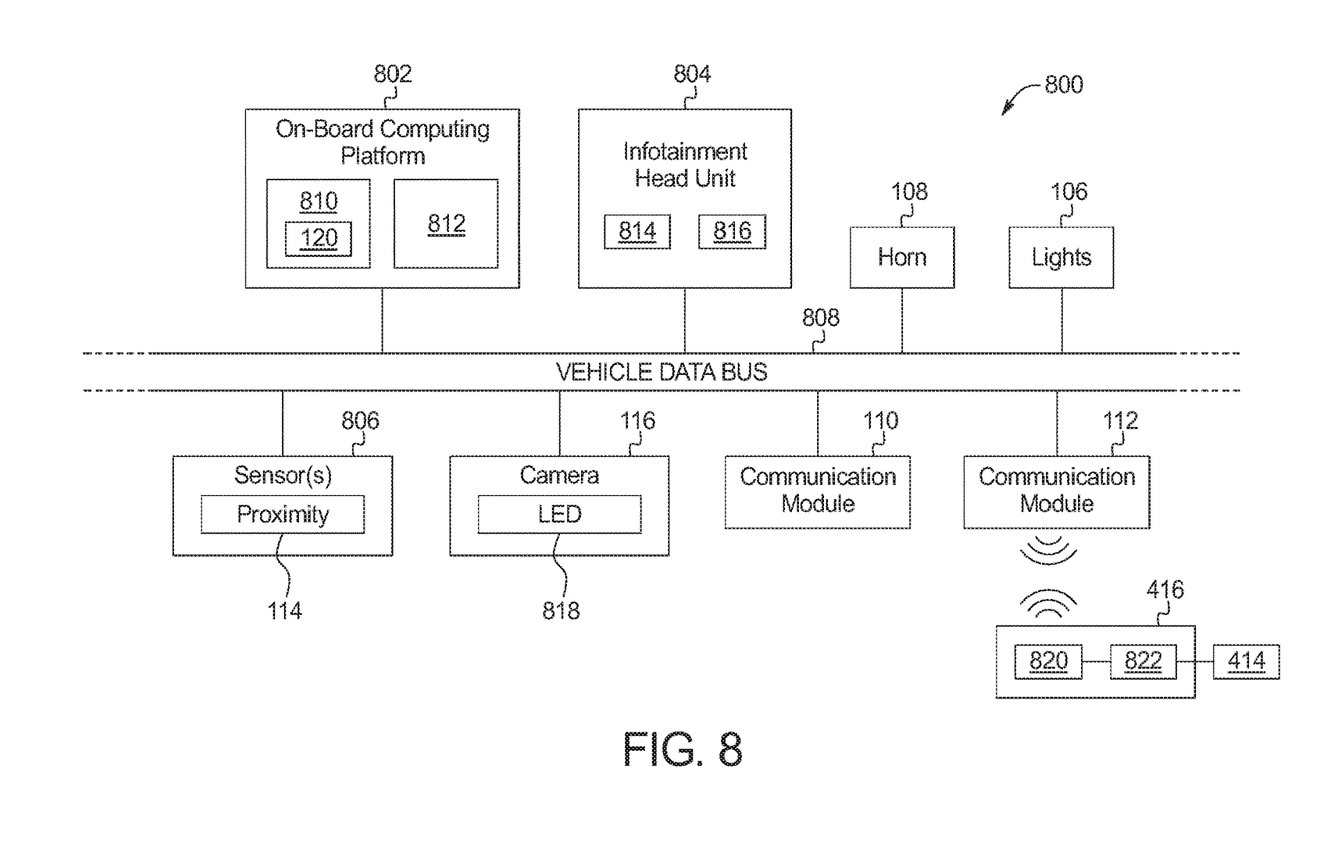
FIG. 8 is a block diagram of electronic components of the vehicle of FIG. 1.

FIG. 8 is a block diagram of electronic components 800 of the vehicle of FIG. 1. As illustrated in FIG. 8, the electronic components 800 include an on-board computing platform 802, an infotainment head unit 804, the horn 108, the exterior lights 106, one or more sensors 806, the camera 116, the communication module 110, the communication module 112, the hitch module 416, and a vehicle data bus 808.

The on-board computing platform 802 includes a microcontroller unit, controller or processor 810 and memory 812. In some examples, the processor 810 of the on-board computing platform 802 is structured to include the alert controller 120. Alternatively, in some examples, the alert controller 120 is incorporated into another electronic control unit (ECU) with its own processor 810 and memory 812. The processor 810 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 812 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 812 includes multiple kinds of memory, particularly volatile memory and non-volatile memory.

The memory 812 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 812, the computer readable medium, and/or within the processor 810 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 804 provides an interface between the vehicle 100 and a user. The infotainment head unit 804 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display 814 (e.g., a heads-up display, a center console display such as a liquid crystal display (LCD), an organic light emitting diode (OLED) display, a flat panel display, a solid state display, etc.), and/or speakers 816. In the illustrated example, the infotainment head unit 804 includes hardware (e.g., a processor or controller, memory, storage, etc.) and software (e.g., an operating system, etc.) for an infotainment system (such as SYNC® and MyFord Touch® by Ford®). Additionally, the infotainment head unit 804 displays the infotainment system on, for example, the display 814.

The sensors 806 are arranged in and around the vehicle 100 to monitor properties of the vehicle 100 and/or an environment in which the vehicle 100 is located. One or more of the sensors 806 may be mounted to measure properties around an exterior of the vehicle 100. Additionally or alternatively, one or more of the sensors 806 may be mounted inside a cabin of the vehicle 100 or in a body of the vehicle 100 (e.g., an engine compartment, wheel wells, etc.) to measure properties in an interior of the vehicle 100. For example, the sensors 806 include accelerometers, odometers, tachometers, pitch and yaw sensors, wheel speed sensors, microphones, tire pressure sensors, biometric sensors and/or sensors of any other suitable type. In the illustrated example, the sensors 806 include the proximity sensors 114 of the hands-free liftgate system.

The camera 116 of the illustrated example captures image(s) and/or video of a surrounding area of the vehicle 100 behind and/or to the side of the vehicle 100. In some examples, the camera 116 capture image(s) and/or video of the activation area 202 of the hands-free liftgate system to facilitate a determination that an operator has extended his or her leg into the activation area 202. Additionally or alternatively, the camera 116 captures image(s) and/or video of the hitch 104 to monitor the hitch 104 and/or a connection between the vehicle 100 and the trailer 102. Further, the camera 116 may capture image(s) and/or video that are presented to occupant(s) of the vehicle 100 via the display 814 and/or are utilized to facilitate performance of autonomous and/or semi-autonomous driving maneuvers of the vehicle 100. As illustrated in FIG. 8, the camera 116 includes an LED-based light 818 and/or other light that illuminates an area that the camera 116 is capturing via the image(s) and/or video. In some examples, the LED-based light 818 illuminates an area around the hitch 104 in response to the hitch module 416 detecting that a person is near (e.g., touching) the hitch ball 406 of the hitch 104. Additionally or alternatively, the LED-based light 818 illuminates the area behind the vehicle 100 when the vehicle 100 is moving in reverse to hitch to the trailer 102 and one or more of the proximity sensors 113 detect that the vehicle 100 is approaching the trailer coupler 306 of the trailer 102.

In the illustrated example, the communication module 110 is configured to wirelessly communicate via a cellular network and/or other long-range network, and the communication module 112 is configured to wirelessly communicate via a personal wireless area network and/or other short-range wireless network. As illustrated in FIG. 8, the communication module 112 wirelessly communicates with a short-range communication module 820 of the hitch module 416.

The short-range communication module 820 includes wired or wireless network interfaces to enable communication with external networks. The short-range communication module 820 also includes hardware (e.g., processors, memory, storage, antenna, etc.) and software to control the wired or wireless network interfaces. In the illustrated example, the short-range communication module 820 includes one or more communication controllers for wireless personal area network(s) (e.g., including area networks based on the IEEE 802.15 standard) and/or wireless local area network(s) (e.g., Wi-Fi networks and/or other area networks based on the IEEE 802.11 standard). For example, the hardware and firmware of the short-range communication module 820 enable the short-range communication module 820 to establish a connection with a mobile device and/or another short-range wireless module that is located nearby. In some examples, the short-range communication module 820 implements the Bluetooth® and/or Bluetooth Low Energy (BLE) protocols.

In the illustrated example, the short-range communication module 820 coupled to a capacitive switch 822 of the hitch module 416. The capacitive switch 822 is electrically coupled to the electrical connector 414 of the hitch ball 406 to measure, via the hitch ball 406, the capacitance around the hitch ball 406. The short-range communication module 820 wirelessly emits the alert to the communication module 112 of the vehicle 100 and/or a mobile device of a vehicle operator based upon the capacitive measurements of the capacitive switch 822 and the hitch ball 406.

Further, the vehicle data bus 808 communicatively couples the exterior lights 106, the horn 108, the communication module 110, the communication module 112, the camera 116, the on-board computing platform 802, the infotainment head unit 804, and the sensors 806. In some examples, the vehicle data bus 808 includes one or more data buses. The vehicle data bus 808 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 9:
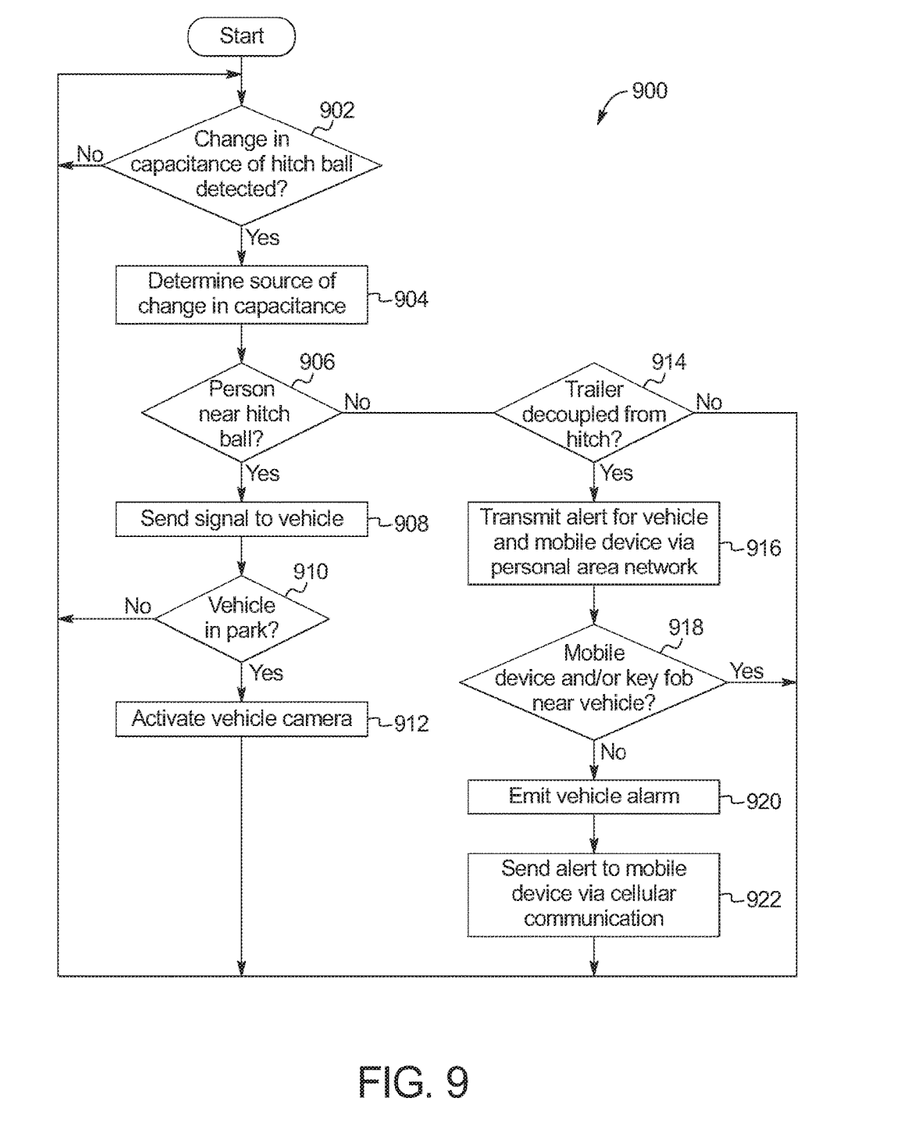
FIG. 9 is a flowchart for monitoring a vehicle hitch via capacitive sensor in accordance with the teachings herein.

FIG. 9 is a flowchart of an example method 900 to monitor a vehicle hitch via capacitive sensor. The flowchart of FIG. 9 is representative of machine readable instructions that are stored in memory (such as the memory 812 of FIG. 8) and include one or more programs which, when executed by a processor (such as the processor 810 of FIG. 8), cause the vehicle 100 to implement the example alert controller 120 of FIGS. 1 and 8 and/or the example hitch module 416 of FIGS. 4-8. While the example program is described with reference to the flowchart illustrated in FIG. 9, many other methods of implementing the example alert controller 120 and/or the example hitch module 416 may alternatively be used. For example, the order of execution of the blocks may be rearranged, changed, eliminated, and/or combined to perform the method 900. Further, because the method 900 is disclosed in connection with the components of FIGS. 1-8, some functions of those components will not be described in detail below.

Initially, at block 902, the hitch module 416 determines whether the capacitive switch 822 of the hitch module 416 has detected, via the hitch ball 406, a change in capacitance. In response to hitch module 416 determining that the capacitive switch 822 has not detected a change in capacitance, the method 900 remains at block 902. Otherwise, in response to hitch module 416 determining that the capacitive switch 822 has detected a change in capacitance, the method 900 proceeds to block 904.

At block 904, the hitch module 416 determines a source of the change in capacitance based on the change in capacitance detected via the hitch ball 406. That is, the hitch module 416 detects a magnitude and direction of the change in capacitance detected by the capacitive switch 822 via the hitch ball 406. Subsequently, the hitch module 416 determines the source of the change in capacitance by comparing the magnitude and direction of the change in capacitance to predetermined increases and/or decreases in capacitance. For example, the hitch module 416 determines that the source of the change in capacitance is the trailer coupler 306 of the trailer 102 being coupled to the hitch 104 if the change in capacitance measured by the capacitive switch 822 via the hitch ball 406 corresponds to a first predetermined decrease in capacitance.

At block 906, the hitch module 416 determines whether the source of the change in capacitance is a person near (e.g., touching) the hitch ball 406. For example, the hitch module 416 determines that the source of the change in capacitance is a person near the hitch 104 if the change in capacitance measured by the capacitive switch 822 via the hitch ball 406 corresponds to a second predetermined decrease in capacitance.

In response to the hitch module 416 determining that a person near the hitch ball 406, the method proceeds to block 908. At block 908, the short-range communication module 820 of the hitch module 416 sends a signal to the communication module 112 of the vehicle 100 and/or a mobile device of a vehicle operator that indicates a person is near the hitch ball 406. For example, upon receiving the signal from the short-range communication module 820 of the hitch module 416, the display 814 and/or the speakers 816 of the vehicle 100 and/or a display and/or speakers of the mobile device present an alert indicating that a person is near the hitch ball 406. At block 910, the alert controller 120 of the vehicle 100 determines whether the vehicle 100 is in park (e.g., via a transmission position sensor). In response to the alert controller 120 determining that the vehicle 100 is not in park, the method 900 returns to block 902. Otherwise, in response to the alert controller 120 determining that the vehicle 100 is in park, the method proceeds to block 912 at which the alert controller 120 sends a signal to activate the camera 116 to cause the LED-based light 818 to illuminate the area around the hitch 104. Additionally or alternatively, the alert controller 120 sends a signal to another light of the vehicle 100 to illuminate the area around the hitch 104. Further, in some examples, the alert controller 120 sends a signal to illuminate the area behind the vehicle 100 via the LED-based light 818 when the vehicle 100 is moving in reverse to hitch to the trailer 102 and one or more of the proximity sensors 113 detect that the vehicle 100 is approaching the trailer coupler 306 of the trailer 102.

Otherwise, in response to the hitch module 416 determining, at block 906, that a person is not near the hitch ball 406, the method proceeds to block 914. At block 914, the hitch module 416 determines whether the source of the change in capacitance is the trailer 102 being decoupled from the hitch 104. For example, the hitch module 416 determines that the source of the change in capacitance is the trailer coupler 306 of the trailer 102 being removed from the hitch 104 if the change in capacitance measured by the capacitive switch 822 via the hitch ball 406 corresponds to a predetermined increase in capacitance. In response to the hitch module 416 determining that the trailer 102 is not being decoupled from the hitch 104, the method 900 returns to block 902. Otherwise, in response to the hitch module 416 determining that the trailer 102 is being decoupled from the hitch 104, the method 900 proceeds to block 916 at which the short-range communication module 820 of the hitch module 416 transmits an alert signal via a wireless personal area network (e.g., Bluetooth® communication, BLE communication, etc.) and/or a wireless local area network (e.g., Wi-Fi communication) to be received by the communication module 112 of the vehicle 100 and/or the mobile device of the vehicle operator. The alert signal indicates that the trailer 102 has been decoupled from the hitch 104. For example, upon receiving the alert signal from the hitch module 416, the vehicle presents an alert (e.g., via the display 814, the speakers 816, etc.) to notify the vehicle operator that the trailer 102 has been decoupled from the hitch 104. Additionally or alternatively, upon receiving the alert signal from the hitch module 416, the mobile device of the vehicle operator presents an alert (e.g., a visual alert, an audio alert, etc.) to notify the vehicle operator that the trailer 102 has been decoupled from the hitch 104.

At block 918, the alert controller 120 determines whether a key fob of the vehicle operator and/or the mobile device of the vehicle operator that is functioning as a phone-as-a-key is located near the vehicle 100 (e.g., within a predetermined distance of the communication module 112 of the vehicle 100. If the key fob or phone-as-a-key is within the predetermined distance of the vehicle 100, the alert controller 120 determines that the mobile device of the vehicle operator is capable of receiving the alert signal transmitted by the hitch module 416 via the wireless personal and/or local area network. If the key fob or phone-as-a-key is located beyond the predetermined distance of the vehicle 100, the alert controller 120 determines that the mobile device of the vehicle operator is unable to receive the alert signal transmitted by the hitch module 416. In response to the alert controller 120 determining that the key fob or phone-as-a-key is within the predetermined distance such that the mobile device of the vehicle operator is able to receive the alert signal, the method 900 returns to block 902. Otherwise, in response to the alert controller 120 determining that the key fob or phone-as-a-key is not within the predetermined distance of the vehicle 100, the method 900 proceeds to block 920 at which the alert controller 120 emits an alarm via the exterior lights 106 (e.g., for a visual alarm) and/or the horn 108 (e.g., for an audio alarm) of the vehicle 100 to warn that the trailer 102 has been removed from the hitch 104 of the vehicle 100. Further, at block 922, the communication module 110 of the vehicle 100 sends or relays the alert signal, which the communication module 112 of the vehicle 100 received from the hitch module 416, to the mobile device of the vehicle operator via cellular communication to alert the vehicle operator that the trailer 102 has been removed from the hitch 104 of the vehicle 100.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a hitch including:
      a body;
      a hitch ball; and
      a sleeve that electrically insulates the hitch ball from the body;
   a hitch module including a capacitive switch electrically coupled to the hitch ball, the hitch module to wirelessly emit an alert that a trailer has decoupled from the hitch responsive to the capacitive switch detecting, via the hitch ball, a predetermined increase in capacitance.

2. The vehicle of claim 1, wherein:
   the body defines an aperture;
   a protrusion extends from the hitch ball and extends through the aperture to couple the hitch ball to the body; and
   the sleeve is positioned within the aperture between the protrusion of the hitch ball and the body.

3. The vehicle of claim 1, wherein the hitch module is coupled to the hitch and provides a charge to the hitch ball to enable the hitch ball to emit an electric field to form a capacitive sensor.

4. The vehicle of claim 1, wherein a portion of the body is positioned between the hitch ball and a ground surface to:
   enable the capacitive switch in monitoring a change in capacitance above the body of the hitch around the hitch ball; and
   prevent the capacitive switch from monitoring a change in capacitance below the body of the hitch.

5. The vehicle of claim 1, wherein the hitch module determines that the trailer has coupled to the hitch responsive to the capacitive switch detecting, via the hitch ball, a first predetermined decrease in capacitance.

6. The vehicle of claim 1, further including a light that illuminates an area around the hitch responsive to detecting that a person is near the hitch ball.

7. The vehicle of claim 6, further including a camera that is positioned near the hitch and includes the light.

8. The vehicle of claim 6, wherein the hitch module determines that the person is near the hitch ball responsive to the capacitive switch detecting, via the hitch ball, a second predetermined decrease in capacitance.

9. The vehicle of claim 1, further including a first communication module for communication via a wireless personal area network.

10. The vehicle of claim 9, wherein the hitch module wirelessly emits the alert via the wireless personal area network for the first communication module and a mobile device of a vehicle operator.

11. The vehicle of claim 10, further including an alert controller that determines whether a key fob or a phone-as-a-key of the vehicle operator is located within a predetermined distance of the first communication module.

12. The vehicle of claim 11, further including a second communication module for communication via a cellular network, the second communication module to relay the alert to the mobile device responsive to the alert controller determining that the key fob or the phone-as-a-key of the vehicle operator is located outside of the predetermined distance.

13. The vehicle of claim 11, further including at least one of exterior lights and a horn to emit an alarm responsive to:
the hitch module determining that the trailer has decoupled from the hitch; and
the alert controller determining that the key fob or the phone-as-a-key of the vehicle operator is located outside of the predetermined distance.

14. The vehicle of claim 1, further including a liftgate near the hitch and a hands-free liftgate system, the hands-free liftgate system including a proximity sensor near the hitch for detecting a presence of a vehicle operator near the liftgate.

15. The vehicle of claim 14, wherein the hitch ball is positioned above the body of the hitch and the proximity sensor to enable the capacitive switch to monitor, via the hitch ball, a first area above the body of the hitch and the proximity sensor to monitor a second area below the body of the hitch.

16. A method comprising:
monitoring, via a capacitive switch of a hitch module, a capacitance around a hitch ball of a hitch, the hitch ball being electrically insulated via a sleeve;
detecting whether there is a predetermined increase in capacitance around the hitch ball; and
wirelessly emitting, via the hitch module, an alert that a trailer has decoupled from the hitch responsive to the capacitive switch detecting, via the hitch ball, a predetermined increase in capacitance.

17. The method of claim 16, further including determining that the trailer has coupled to the hitch responsive to the capacitive switch detecting, via the hitch ball, a first predetermined decrease in capacitance.

18. The method claim 16, further including:
determining that a person is near the hitch ball responsive to the capacitive switch detecting, via the hitch ball, a second predetermined decrease in capacitance; and
illuminating, via a light, an area around the hitch responsive to detecting that the person is near the hitch ball.

19. The method of claim 16, wherein the alert is wirelessly emitted via a wireless personal area network for a first communication module of a vehicle and a mobile device of a vehicle operator.

20. The method of claim 19, further including, responsive to determining that a key fob or a phone-as-a-key of the vehicle operator is beyond a predetermined distance from the vehicle, relaying, via a second communication module, the alert to a mobile device of the vehicle operator via cellular network and wirelessly emitting an alarm via at least one of exterior lights and a horn of the vehicle.

* * * * *